US012785242B2

(12) United States Patent
Goto

(10) Patent No.: US 12,785,242 B2
(45) Date of Patent: Nov. 3, 2026

(54) COMPUTING DEVICE

(71) Applicant: KABUSHIKI KAISHA TOSHIBA, Tokyo (JP)

(72) Inventor: Hayato Goto, Kawasaki Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 181 days.

(21) Appl. No.: 18/761,361

(22) Filed: Jul. 2, 2024

(65) Prior Publication Data

US 2025/0079682 A1 Mar. 6, 2025

(30) Foreign Application Priority Data

Aug. 28, 2023 (JP) ................................ 2023-138034

(51) Int. Cl.
*H01P 7/06* (2006.01)
*H01P 5/02* (2006.01)

(52) U.S. Cl.
CPC . *H01P 7/06* (2013.01); *H01P 5/02* (2013.01)

(58) Field of Classification Search
CPC .................................... H01P 7/06; H01P 5/02
See application file for complete search history.

(56) References Cited

U.S. PATENT DOCUMENTS 10,461,385 B2 * 10/2019 Sliwa ........................ H01P 1/38
11,184,006 B2 * 11/2021 Wang .................. H03K 19/195

OTHER PUBLICATIONS

James D. Teoh et al., "Dual-rail encoding with superconducting cavities," arXiv: 2212.12077, 23 pages (2022).
Hayato Goto, "Double-Transmon Coupler: Fast Two-Qubit Gate with No Residual Coupling for Highly Detuned Superconducting Qubits," Physical Review Applied, vol. 18, No. 034038, 10 pages (2022).
Imran Mahboob et al., "A three-dimensional Josephson parametric amplifier," Appl. Phys. Exp. vol. 15, No. 062005, DOI:10.35848/1882-0786/ac702d, 5 pages (2022).

(Continued)

*Primary Examiner* — Andrea Lindgren Baltzell
*Assistant Examiner* — Kimberly E Glenn
(74) *Attorney, Agent, or Firm* — Finnegan, Henderson, Farabow, Garrett & Dunner, LLP

(57) ABSTRACT

According to one embodiment, a computing device includes an element section, a first conductive portion, a second conductive portion, a first coupling conductive portion, and a controller. The element section includes a first structure, a second structure, and a first coupling structure. The first structure includes a first cavity resonator having a first resonance frequency, a first other cavity resonator having a first other resonance frequency, and a first coupler configured to couple the first cavity resonator and the first other cavity resonator. The first other resonance frequency is lower than the first resonance frequency. The second structure includes a second cavity resonator having a second resonance frequency, a second other cavity resonator having a second other resonance frequency, and a second coupler configured to couple the second cavity resonator and the second other cavity resonator. The second other resonance frequency is lower than the second resonance frequency.

20 Claims, 5 Drawing Sheets

(56) References Cited

OTHER PUBLICATIONS

Hanhee Paik et al., "Experimental Demonstration of a Resonator-Induced Phase Gate in a Multiqubit Circuit-QED System," Phys. Rev. Lett., vol. 117, No. 250502, DOI: 10.1103/PhysRevLett.117.250502, 5 pages (2016).

V.V. Sivak et al., "Real-time quantum error correction beyond break-even," Nature, DOI: 10.1038/s41586-023-05782-6, 8 pages (2023).

* cited by examiner

COMPUTING DEVICE

CROSS-REFERENCE TO RELATED APPLICATIONS

This application is based upon and claims the benefit of priority from Japanese Patent Application No. 2023-138034, filed on Aug. 28, 2023; the entire contents of which are incorporated herein by reference.

FIELD

Embodiments described herein relate generally to a computing device.

BACKGROUND

For example, electronic circuits including multiple non-linear elements are used in computing devices. Stabilization of characteristics is desired in electronic circuits and computing devices.

DETAILED DESCRIPTION

Figure 1:
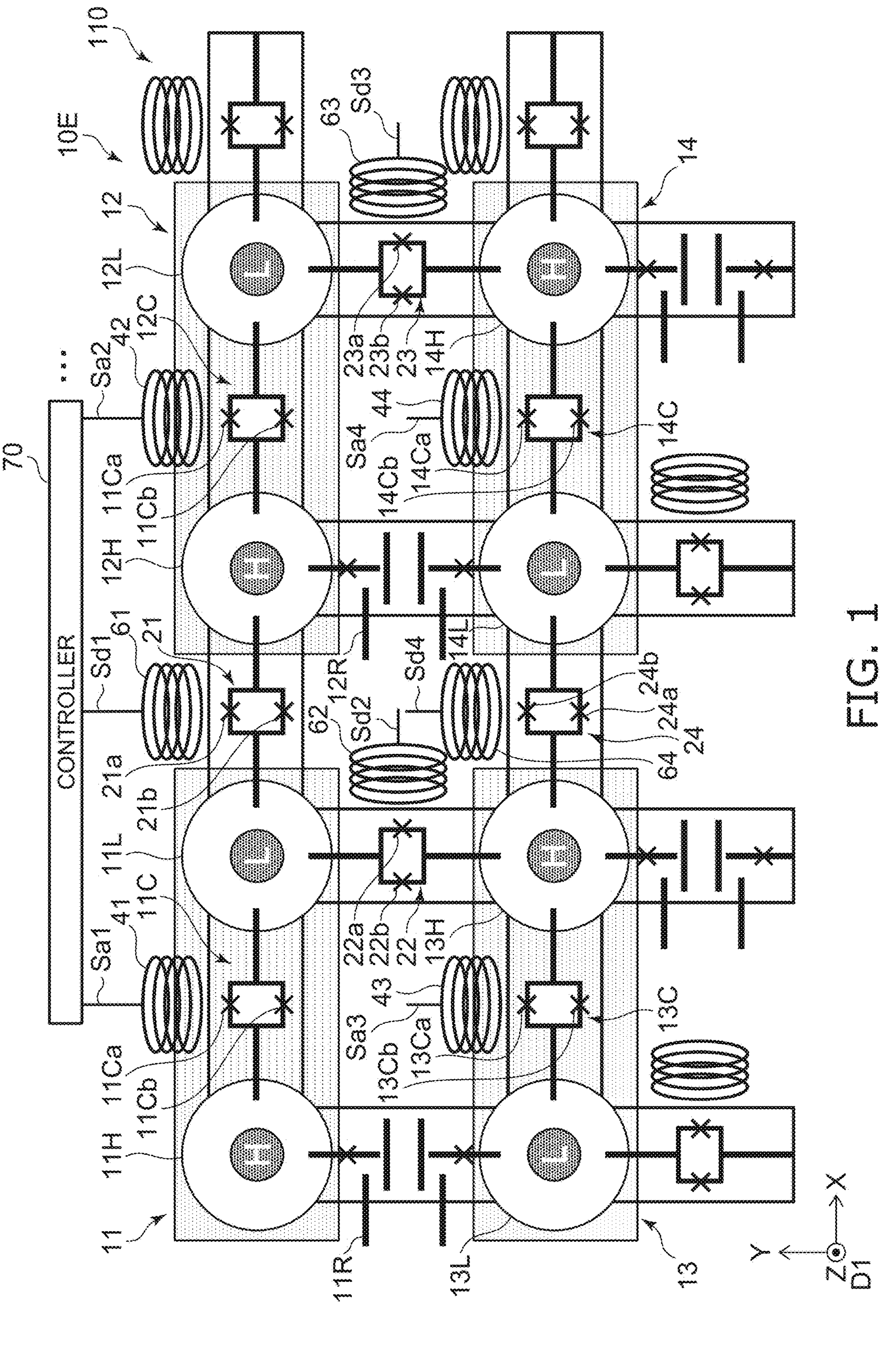
FIG. 1 is a schematic plan view illustrating a computing device according to a first embodiment.

According to one embodiment, a computing device includes an element section, a first conductive portion, a second conductive portion, a first coupling conductive portion, and a controller. The element section includes a first structure, a second structure, and a first coupling structure. The first structure includes a first cavity resonator having a first resonance frequency, a first other cavity resonator having a first other resonance frequency, and a first coupler configured to couple the first cavity resonator and the first other cavity resonator. The first other resonance frequency is lower than the first resonance frequency. The second structure includes a second cavity resonator having a second resonance frequency, a second other cavity resonator having a second other resonance frequency, and a second coupler configured to couple the second cavity resonator and the second other cavity resonator. The second other resonance frequency is lower than the second resonance frequency. The first coupling structure is configured to couple the first structure and the second structure. The controller is configured to supply a first AC signal including an AC component to the first conductive portion. The controller is configured to supply a second AC signal including an AC component to the second conductive portion. A first magnetic field generated from the first conductive portion in response to the first AC signal is applied to the first coupler. A second magnetic field generated from the second conductive portion in response to the second AC signal is applied to the second coupler. The controller is configured to supply a first DC pulse signal to the first coupling conductive portion. A first coupling magnetic field generated from the first coupling conductive portion in response to the first DC pulse signal is applied to the first coupling structure.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic plan view illustrating a computing device according to the first embodiment.

Figure 2:
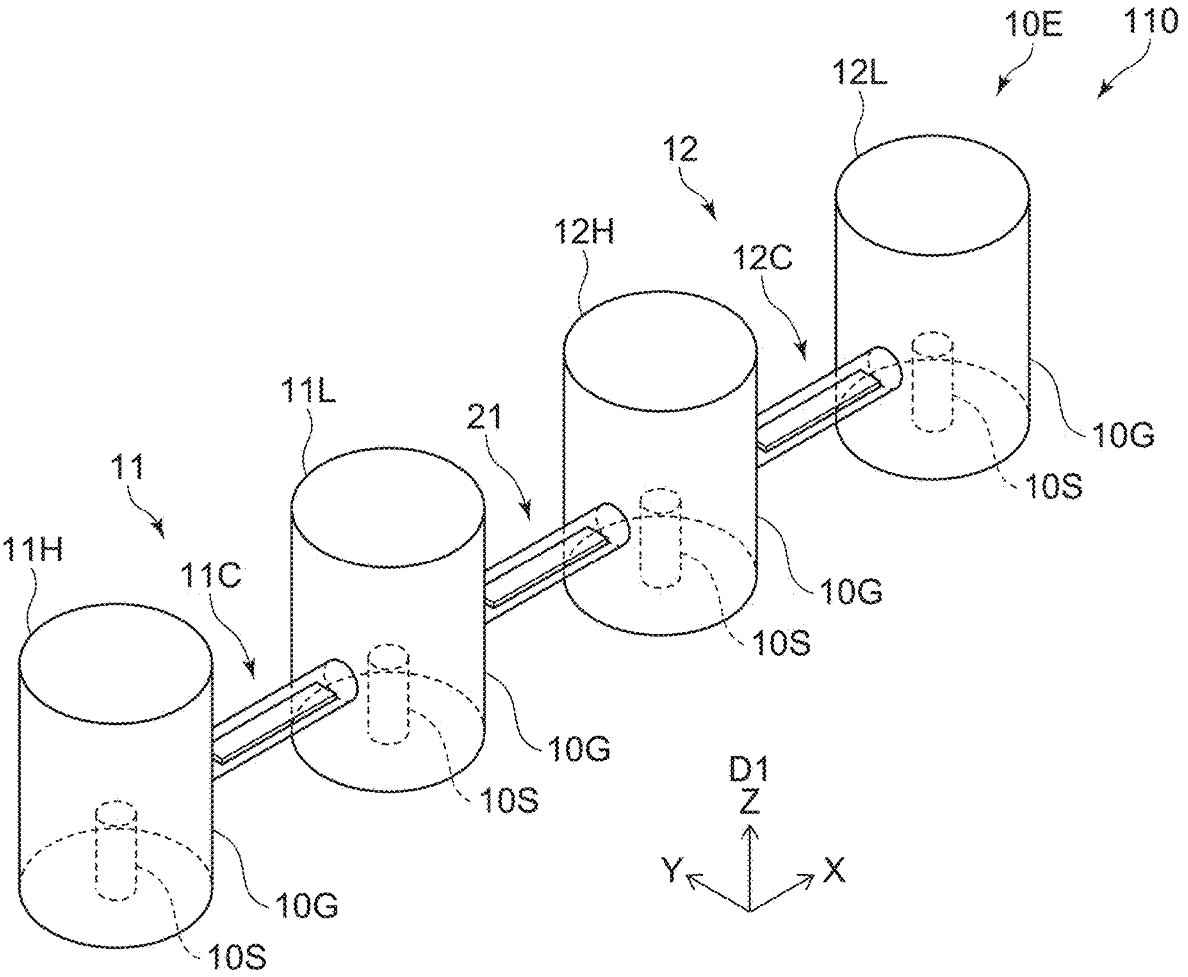
FIG. 2 is a schematic perspective view illustrating a part of the computing device according to the first embodiment.

FIG. 2 is a schematic perspective view illustrating a part of the computing device according to the first embodiment.

As shown in FIG. 1, a computing device 110 according to the embodiment includes an element section 10E. In this example, the computing device 110 further includes a first conductive portion 41, a second conductive portion 42, a first coupling conductive portion 61, and a controller 70.

The element section 10E includes a first structure 11, a second structure 12, and a first coupling structure 21. The first structure 11 includes a first cavity resonator 11H having a first resonance frequency, a first other cavity resonator 11L having a first other resonance frequency, and a first coupler 11C. The first coupler 11C is configured to couple the first cavity resonator 11H and the first other cavity resonator 11L. The first other resonance frequency is lower than the first resonance frequency. The first structure 11 is a resonator pair including two cavity resonators.

The second structure 12 includes a second cavity resonator 12H having a second resonance frequency, a second other cavity resonator 12L having a second other resonance frequency, and a second coupler 12C. The second coupler 12C is configured to couple the second cavity resonator 12H and the second other cavity resonator 12L. The second other resonance frequency is lower than the second resonance frequency. The second structure 12 is another resonator pair including two cavity resonators.

The first coupling structure 21 is configured to couple the first structure 11 and the second structure 12. In this example, the first other cavity resonator 11L is provided between the first cavity resonator 11H and the first coupling structure 21. The second cavity resonator 12H is provided between the first coupling structure 21 and the second other cavity resonator 12L. The first coupling structure 21 is provided between the first other cavity resonator 11L and the second cavity resonator 12H.

For example, the first coupling structure 21 is configured to be coupled to the first other cavity resonator 11L and the second cavity resonator 12H.

The controller 70 is configured to supply a first AC signal Sa1 including an AC component to the first conductive portion 41. The controller 70 is configured to supply a second AC signal Sa2 including an AC component to the second conductive portion 42. A first magnetic field (AC magnetic field) generated from the first conductive portion 41 in response to the first AC signal Sa1 is applied to the first coupler 11C. A second magnetic field (AC magnetic field) generated from the second conductive portion 42 in response to the second AC signal Sa2 is applied to the second coupler 12C. In one example, the first conductive portion 41 and the second conductive portion 42 are coils. The first conductive portion 41 and the second conductive portion 42 may be any conductive member to which a current can be supplied. The conductive member may be provided, for example, on a member (base) on which the coupling structure is provided. The coil may be provided away from a member (base) on which the coupling structure is provided.

The controller 70 is configured to supply a first DC pulse signal Sd1 to the first coupling conductive portion 61. The first coupling magnetic field generated from the first coupling conductive portion 61 is applied to the first coupling structure 21 in response to the first DC pulse signal Sd1.

For example, one of the first cavity resonator 11H and the first other cavity resonator 11L is in a single photon state. The other of the first cavity resonator 11H and the first other cavity resonator 11L is in a zero-photon state (For example, "vacuum state"). For example, a state in which the first cavity resonator 11H is in a single-photon state and the first other cavity resonator 11L is in a vacuum state corresponds to one of "0" and "1" (e.g., "0"). For example, a state in which the first cavity resonator 11H is in a vacuum state and the first other cavity resonator 11L is in a single-photon state corresponds to one of "0" and "1" (e.g., "1"). A state other than the above two states corresponds to an error state. The presence of photons in one of the resonators represents a qubit. The first structure 11 functions as a qubit.

Similarly, for example, one of the second cavity resonator 12H and the second other cavity resonator 12L is in a single photon state. The other of the second cavity resonator 12H and the second other cavity resonator 12L is in a zero-photon state (For example, "vacuum state"). The presence of photons in one of the resonators represents a qubit. The second structure 12 functions as another qubit.

As described above, in the embodiment, an alternating magnetic field is applied to the first coupler 11C. Thereby, the state of the first structure 11 (qubit) can be controlled. An alternating magnetic field is applied to the second coupler 12C. Thereby, the state of the second structure 12 (qubit) can be controlled. That is, a one-qubit gate operation is performed.

As described above, in the embodiment, a DC pulse magnetic field is applied to the first coupling structure 21. Thereby, two-qubit gates are executed on the first structure 11 (qubit) and the second structure 12 (qubit).

In embodiments, for example, a qubit gate operation can be easily performed. The qubit gate operation can be performed at high speed. It is easy to scale up. According to the embodiment, a computing device capable of improving characteristics can be provided.

The first coupler 11C, the second coupler 12C, and the first coupling structure 21 are, for example, a frequency-tunable transmon coupler.

In the embodiment, cavity resonators are used. The cavity resonator is, for example, a three-dimensional superconducting microwave resonator. In the cavity resonator, the coherence time is long. Two cavity resonators (resonator pairs) are used as a qubit. A qubit is represented by whether there is one photon in one of the two cavity resonators. The one-qubit gate operation can be performed by controlling an alternating magnetic field (alternating magnetic flux) to a frequency-tunable transmon coupler that couples two cavity resonators of a resonator pair (modulation of the frequency of the transmon). A plurality of qubits are coupled by a frequency-tunable transmon coupler. For example, by controlling the DC magnetic field (DC magnetic flux) (changing the transmon frequency) for a frequency-tunable transmon coupler that couples two cavity resonators belonging to different qubits (resonator pairs), a two-qubit gate operation can be executed.

In the embodiment, the controller 70 is configured to control the frequency of the AC component of the first AC signal Sa1. Thereby, the one-qubit gate operation in the first structure 11 can be executed. The controller 70 is configured to control the frequency of the AC component of the second AC signal Sa2. Thereby, the one-qubit gate operation in the second structure 12 can be performed.

For example, the controller 70 may set the frequency of the AC component of the first AC signal Sa1 to a value based on the first resonance frequency and the first other resonance frequency. For example, the controller 70 may set the frequency of the AC component of the second AC signal Sa2 to a value based on the second resonance frequency and the second other resonance frequency.

In one example, the controller 70 may set the frequency of the AC component of the first AC signal Sa1 to a first difference between the first resonance frequency and the first other resonance frequency. Thereby, the one-qubit gate operation in the first structure 11 can be performed. The controller 70 may set the frequency of the AC component of the second AC signal Sa2 to a second difference between the second resonance frequency and the second other resonance frequency. Thereby, the one-qubit gate operation in the second structure 12 can be performed. For example, the controller 70 may set the frequency of the AC component of the first AC signal Sa1 to a value of not less than 0.5 times and not more than 2 times the first difference. For example, the controller 70 may set the frequency of the AC component of the second AC signal Sa2 to a value of not less than 0.5 times and not more than 2 times the second difference.

In another example, the controller 70 is configured to set the frequency of the AC component of the first AC signal Sa1 to a first sum of the first resonance frequency and the first other resonance frequency. Thereby, the one-qubit gate operation in the first structure 11 can be performed. The controller 70 is configured to set the frequency of the AC component of the second AC signal Sa2 to a second sum of the second resonance frequency and the second other resonance frequency. Thereby, the one-qubit gate operation in the second structure 12 can be performed.

In another example, the controller 70 is configured to set the frequency of the AC component of the first AC signal Sa1 to a first value between twice the first resonance frequency and twice the first other resonance frequency. Thereby, the one-qubit gate operation in the first structure 11 can be performed. The controller 70 is configured to set the frequency of the AC component of the second AC signal Sa2 to a second value between twice the second resonance frequency and twice the second other resonance frequency. Thereby, the one-qubit gate operation in the second structure 12 can be executed.

For example, a first state is before the first DC pulse signal Sd1 is supplied to the first coupling conductive portion 61. In a second state, the first DC pulse signal Sd1 is supplied to the first coupling conductive portion 61.

For example, a difference between a first state resonance frequency of the first coupling structure 21 in the first state and a first other resonance frequency is larger than a difference between a second state resonance frequency of the first coupling structure 21 in the second state and a first other resonance frequency.

For example, before the first DC pulse signal Sd1 is supplied, the resonance frequency of the first coupling structure 21 is greatly detuned from the first other resonance frequency. When the first DC pulse signal Sd1 is supplied, the resonance frequency of the first coupling structure 21 approaches the first other resonance frequency. After the first DC pulse signal Sd1 is supplied, the resonance frequency of the first coupling structure 21 is largely detuned from the first other resonance frequency and returned to its original state.

For example, a difference between the first state resonance frequency of the first coupling structure 21 in the first state and the second resonance frequency is larger than a difference between the second state resonance frequency of the first coupling structure 21 in the second state and the second resonance frequency.

For example, before the first DC pulse signal Sd1 is supplied, the resonance frequency of the first coupling structure 21 is greatly detuned from the second resonance frequency. When the first DC pulse signal Sd1 is supplied, the resonance frequency of the first coupling structure 21 approaches the second resonance frequency. After the first DC pulse signal Sd1 is supplied, the resonance frequency of the first coupling structure 21 is largely detuned from the second resonance frequency and returned to its original state. Such an operation executes a two-qubit gate operation. The two-qubit gate operation by such an operation is based on, for example, a ZZ coupling (See, e.g., H. Goto, Physical Review Applied 18, 034038 (2022)).

FIG. 2 illustrates the first structure 11, the second structure 12, and the first coupling structure 21. The first cavity resonator 11H, the first other cavity resonator 11L, the second cavity resonator 12H, and the second other cavity resonator 12L may be along cylindrical in the first direction D1. The resonators (first cavity resonator 11H, first other cavity resonator 11L, second cavity resonator 12H, and second other cavity resonator 12L) include an enclosure member 10G (cylindrical portion), and an inner member 10S (columnar portion). The inner member 10S is provided in the enclosure member 10G.

The first direction D1 is defined as a Z-axis direction. One direction perpendicular to the Z-axis direction is defined as an X-axis direction. A directions perpendicular to the Z-axis direction and the X-axis direction is defined as a Y-axis direction. The first cavity resonator 11H, the first other cavity resonator 11L, the second cavity resonator 12H, and the second other cavity resonator 12L may be arranged along the X-Y plane, for example.

As shown in FIG. 1, in this example, the first coupler 11C includes a first Josephson junction 11Ca and a first other Josephson junction 11Cb connected in parallel with the first Josephson junction 11Ca. The second coupler 12C includes a second Josephson junction 12Ca and a second other Josephson junction 12Cb connected in parallel with the second Josephson junction 12Ca. The first coupling structure 21 includes a first coupling Josephson junction 21*a* and a first coupling other Josephson junction 21*b* connected in parallel with the first coupling Josephson junction 21*a*. Each of the first coupler 11C, the second coupler 12C, and the first coupling structure 21 includes a loop including a plurality of Josephson junctions. By controlling the magnetic flux in the loop, the resonance frequency can be adjusted. Thereby, tunable coupling is possible.

As shown in FIG. 1, the computing device 110 may further include a third conductive portion 43 and a second coupling conductive portion 62. The element section 10E includes a third structure 13 and a second coupling structure 22. The third structure 13 includes a third cavity resonator 13H having a third resonance frequency, a third other cavity resonator 13L having a third other resonance frequency, and a third coupler 13C. The third coupler 13C is configured to couple the third cavity resonator 13H and the third other cavity resonator 13L. A third other resonance frequency is lower than a third resonance frequency. The third structure 13 functions as a qubit. The second coupling structure 22 is configured to couple the first other cavity resonator 11L and the third cavity resonator 13H.

The controller 70 is configured to supply a third AC signal Sa3 including an AC component to the third conductive portion 43. A third magnetic field generated from the third conductive portion is applied to the third coupler 13C in response to the third AC signal Sa3. The controller 70 is configured to supply the second DC pulse signal Sd2 to the second coupling conductive portion 62. The second coupling magnetic field generated from the second coupling conductive portion 62 is applied to the second coupling structure 22 in response to the second DC pulse signal Sd2.

A one-qubit gate operation in the third structure 13 can be performed by the third magnetic field based on the third AC signal Sa3. A two-qubit gate operation in the first structure 11 and the third structure 13 can be performed by the second coupling magnetic field based on the second DC pulse signal Sd2.

As shown in FIG. 1, the computing device 110 may further include a first read resonator 11R. The first read resonator 11R may be coupled to the first cavity resonator 11H and the third other cavity resonator 13L. The first read resonator 11R is configured to read out the state (photon state) of the qubits in the first structure 11 and the third structure 13.

As shown in FIG. 1, in this example, the third coupler 13C includes a third Josephson junction 13Ca and a third other Josephson junction 13Cb connected in parallel with the third Josephson junction 13Ca. The second coupling structure 22 includes a second coupling Josephson junction 22*a* and a second coupling other Josephson junction 22*b* connected in parallel with the second coupling Josephson junction 22*a*. Tunable coupling is possible.

As shown in FIG. 1, the computing device 110 may further include a fourth conductive portion 44 and a third coupling conductive portion 63. The element section 10E includes a fourth structure 14 and a third coupling structure 23. The fourth structure 14 includes a fourth cavity resonator 14H having a fourth resonance frequency, a fourth other cavity resonator 14L having a fourth other resonance frequency, and a fourth coupler 14C. The fourth coupler 14C is configured to couple the fourth cavity resonator 14H and the fourth other cavity resonator 14L. The fourth other resonance frequency is lower than the fourth resonance frequency. The fourth structure 14 functions as a qubit. The third coupling structure 23 is configured to couple the second other cavity resonator 12L and the fourth cavity resonator 14H.

The controller 70 is configured to supply a fourth AC signal Sa4 including an AC component to the fourth conductive portion 44. A fourth magnetic field generated from the fourth conductive portion 44 is applied to the fourth coupler 14C in response to the fourth AC signal Sa4. The controller 70 is configured to supply a third DC pulse signal Sd3 to the third coupling conductive portion 63. A third coupling magnetic field generated from the third coupling conductive portion 63 is applied to the third coupling structure 23 in response to the third DC pulse signal Sd3.

A one-qubit gate operation in the fourth structure 14 can be performed by the fourth magnetic field based on the fourth AC signal Sa4. A two-qubit gate operation in the second structure 12 and the fourth structure 14 can be performed by the third coupling magnetic field based on the third DC pulse signal Sd3.

As shown in FIG. 1, the computing device 110 may further include a second read resonator 12R. The second read resonator 12R is configured to be coupled to the second cavity resonator 12H and the fourth other cavity resonator 14L. The state of the qubit (photon state) in the second structure 12 and the fourth structure 14 can be read out by the second read resonator 12R.

As shown in FIG. 1, in this example, the fourth coupler 14C includes a fourth Josephson junction 14Ca and a fourth other Josephson junction 14Cb connected in parallel with the fourth Josephson junction 14Ca. The third coupling structure 23 includes a third coupling Josephson junction 23*a* and a third coupling other Josephson junction 23*b* connected in parallel with the third coupling Josephson junction 23*a*. Tunable frequency coupling is possible.

As shown in FIG. 1, the computing device 110 may further include a fourth coupling conductive portion 64. The element section 10E includes a fourth coupling structure 24. The fourth coupling structure 24 is configured to couple the third cavity resonator 13H and the fourth other cavity resonator 14L. The controller 70 is configured supply a fourth DC pulse signal Sd4 to the fourth coupling conductive portion 64. A fourth coupling magnetic field generated from the fourth coupling conductive portion 64 is applied to the fourth coupling structure 24 in response to the fourth DC pulse signal Sd4. A two-qubit gate operations in the third structure 13 and the fourth structure 14 can be performed by the fourth coupling magnetic field based on the fourth DC pulse signal Sd4. An operation similar to that described above with respect to the first structure 11 and the second structure 12 may be applied to the third structure 13 and the fourth structure 14.

As shown in FIG. 1, in this example, the fourth coupling structure 24 includes a fourth coupling Josephson junction 24*a* and a fourth coupling other Josephson junction 24*b* connected in parallel with the fourth coupling Josephson junction 24*a*. Tunable frequency coupling is possible.

Figure 3:
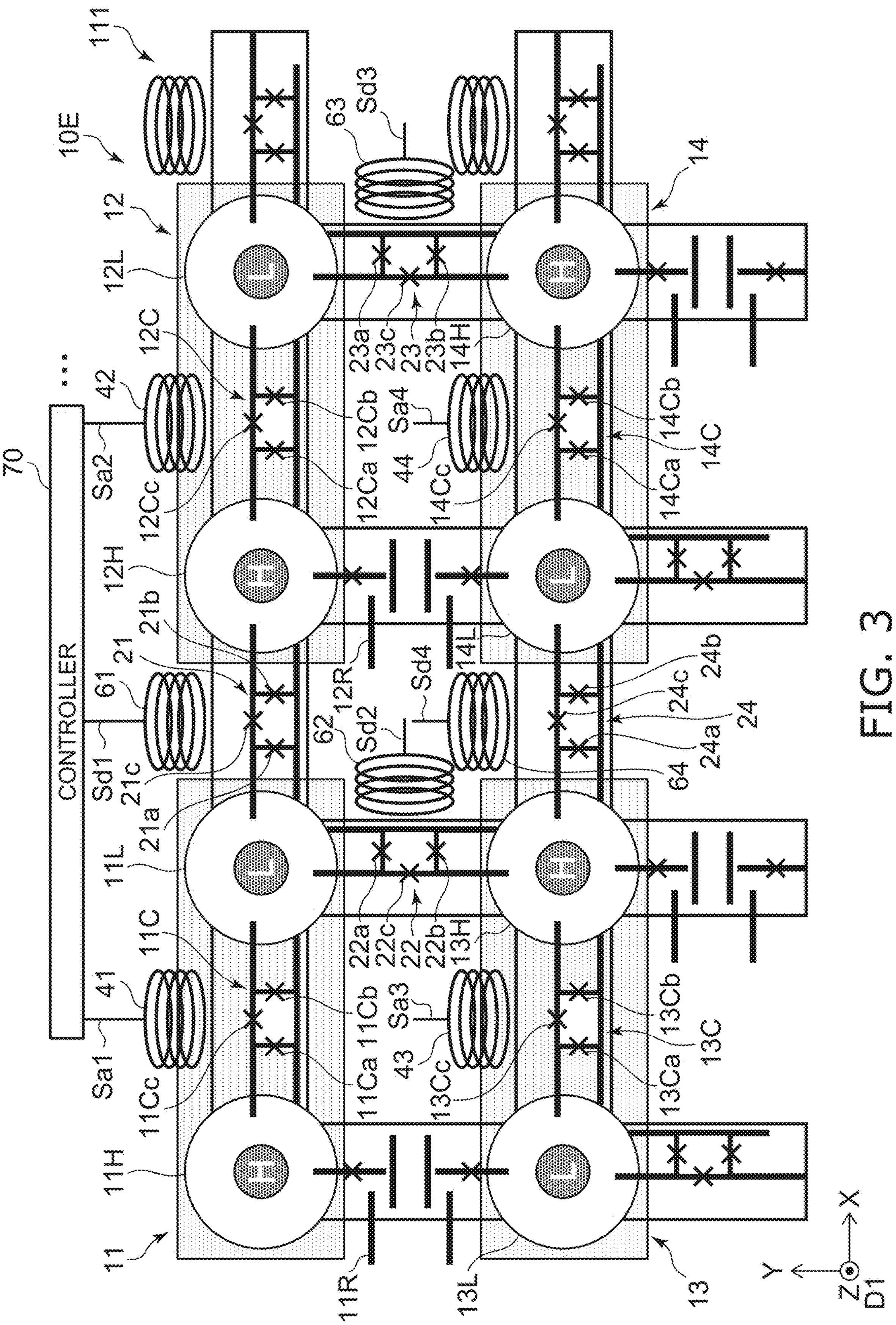
FIG. 3 is a schematic plan view illustrating a computing device according to the first embodiment.

FIG. 3 is a schematic plan view illustrating a computing device according to the first embodiment.

As shown in FIG. 3, the configuration of the coupler and the coupling structure in a computing device 111 according to the embodiment is different from the configuration of the coupler and the coupling structure in the computing device 110. Other configuration of the computing device 111 may be the same as the configuration of the computing device 110.

As shown in FIG. 3, in the computing device 111, the first coupler 11C includes the first Josephson junction 11Ca, the first other Josephson junction 11Cb, and a first intermediate Josephson junction 11Cc. An end of the first Josephson junction 11Ca is connected to an end of the first intermediate Josephson junction 11Cc. Another end of the first Josephson junction 11Ca is connected to another end of the first other Josephson junction 11Cb. An end of the first other Josephson junction 11Cb is connected to another end of the first intermediate Josephson junction 11Cc.

The second coupler 12C includes the second Josephson junction 12Ca, the second other Josephson junction 12Cb, and a second intermediate Josephson junction 12Cc. An end of the second Josephson junction 12Ca is connected to an end of the second intermediate Josephson junction 12Cc. Another end of the second Josephson junction 12Ca is connected to another end of the second other Josephson junction 12Cb. An end of the second other Josephson junction 12Cb is connected to another end of the second intermediate Josephson junction 12Cc.

The first coupling structure 21 includes the first coupling Josephson junction 21*a*, the first coupling other Josephson junction 21*b*, and a first coupling intermediate Josephson junction 21*c*. An end of the first coupling Josephson junction 21*a* is connected to an end of the first coupling intermediate Josephson junction 21*c*. Another end of the first coupling Josephson junction 21*a* is connected to another end of the first coupling other Josephson junction 21*b*. An end of the first coupling other Josephson junction 21*b* is connected to another end of the first coupling intermediate Josephson junction 21*c*.

In the computing device 111, the first coupler 11C, the second coupler 12C, and the first coupling structure 21 are double transmon couplers. Faster gate operation is possible.

In the computing device 111, the third coupler 13C includes the third Josephson junction 13Ca, the third other Josephson junction 13Cb, and a third intermediate Josephson junction 13Cc. An end of the third Josephson junction 13Ca is connected to an end of the third intermediate Josephson junction 13Cc. Another end of the third Josephson junction 13Ca is connected to another end of the third other Josephson junction 13Cb. An end of the third other Josephson junction 13Cb is connected to another end of the third intermediate Josephson junction 13Cc.

The fourth coupler 14C includes the fourth Josephson junction 14Ca, the fourth other Josephson junction 14Cb, and a fourth intermediate Josephson junction 14Cc. An end of the fourth Josephson junction 14Ca is connected to an end of the fourth intermediate Josephson junction 14Cc. Another end of the fourth Josephson junction 14Ca is connected to another end of the fourth other Josephson junction 14Cb. An end of the fourth other Josephson junction 14Cb is connected to another end of the fourth intermediate Josephson junction 14Cc.

The second coupling structure 22 includes the second coupling Josephson junction 22*a*, the second coupling other Josephson junction 22*b*, and a second coupling intermediate Josephson junction 22*c*. An end of the second coupling Josephson junction 22*a* is connected to the end of the second coupling intermediate Josephson junction 22*c*. Another end of the second coupling Josephson junction 22*a* is connected to another end of the second coupling other Josephson junction 22*b*. An end of the second coupling other Josephson junction 22*b* is connected to another end of the second coupling intermediate Josephson junction 22*c*.

The third coupling structure 23 includes the third coupling Josephson junction 23*a*, the third coupling other Josephson junction 23*b*, and a third coupling intermediate Josephson junction 23*c*. An end of the third coupling Josephson junction 23*a* is connected to an end of the third coupling intermediate Josephson junction 23*c*. Another end of the third coupling Josephson junction 23*a* is connected to another end of the third coupling other Josephson junction 23*b*. An end of the third coupling other Josephson junction 23*b* is connected to another end of the third coupling intermediate Josephson junction 23*c*.

The fourth coupling structure 24 includes the fourth coupling Josephson junction 24*a*, the fourth coupling other Josephson junction 24*b*, and a fourth coupling intermediate Josephson junction 24*c*. An end of the fourth coupling Josephson junction 24*a* is connected to an end of the fourth coupling intermediate Josephson junction 24*c*. Another end of the fourth coupling Josephson junction 24*a* is connected to another end of the fourth coupling other Josephson junction 24*b*. An end of the fourth coupling other Josephson junction 24*b* is connected to another end of the fourth coupling intermediate Josephson junction 24*c*.

Figure 4:
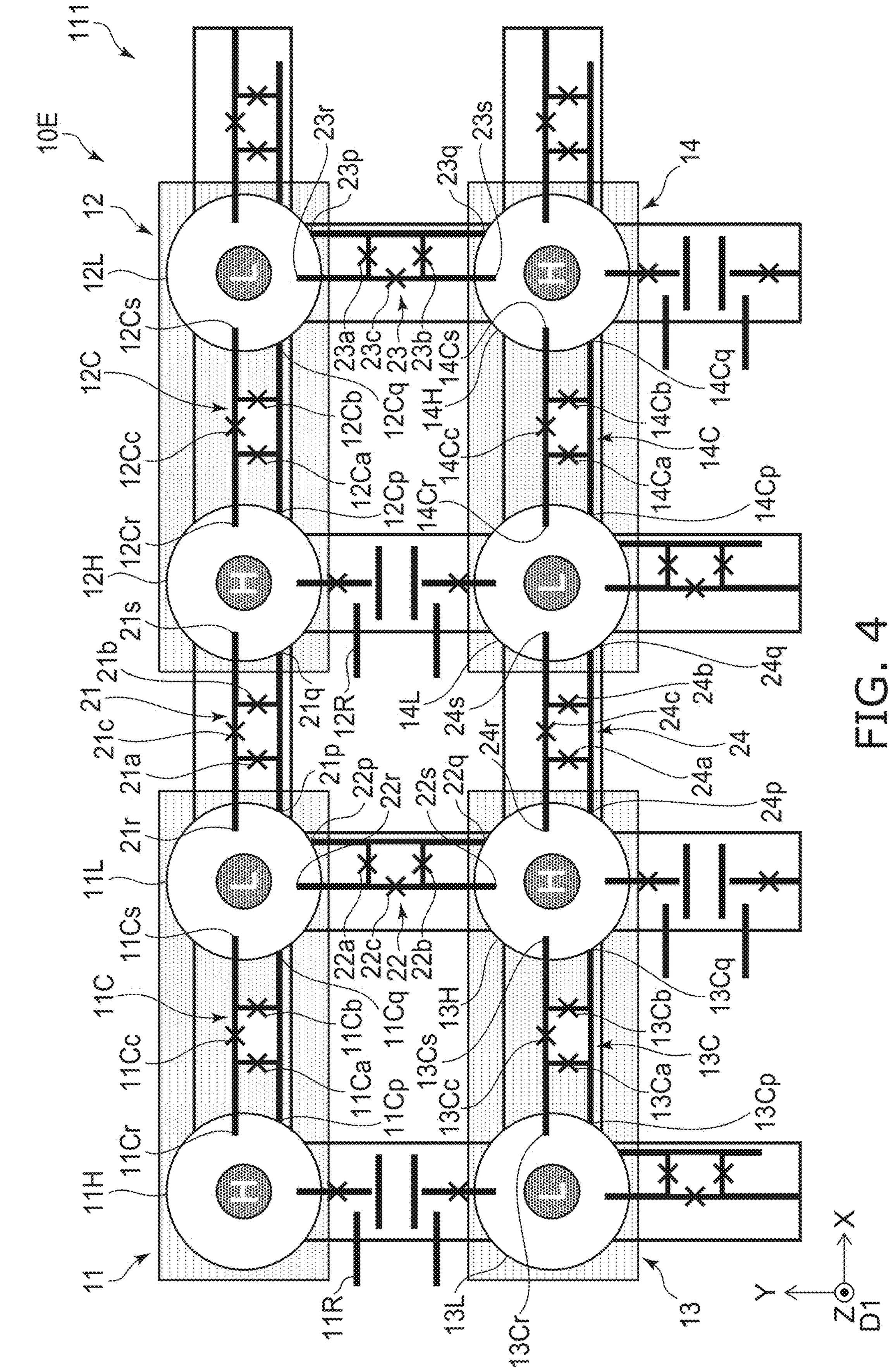
FIG. 4 is a schematic plan view illustrating a computing device according to the first embodiment.

FIG. 4 is a schematic plan view illustrating a computing device according to the first embodiment.

In FIG. 4, the conductive portions (first conductive portion 41, second conductive portion 42, third conductive portion 43, fourth conductive portion 44, first coupling conductive portion 61, second coupling conductive portion 62, third coupling conductive portion 63, fourth coupling conductive portion 64, etc.) is omitted.

In the computing device 111, the first coupler 11C includes a first portion 11Cp, a first other portion 11Cq, a first opposing portion 11Cr, and a first opposing other portion 11Cs. The first opposing portion 11Cr is electrically connected to an end of the first Josephson junction 11Ca and an end of the first intermediate Josephson junction 11Cc. The first opposing other portion 11Cs is electrically connected to an end of the first other Josephson junction 11Cb and another end of the first intermediate Josephson junction 11Cc. The first portion 11Cp is electrically connected to another end of the first Josephson junction 11Ca and another end of the first other Josephson junction 11Cb. The first other portion 11Cq is electrically connected to another end of the first Josephson junction 11Ca and another end of the first other Josephson junction 11Cb.

The first portion 11Cp is electrically connected to the enclosure member 10G (see FIG. 2) of the first cavity resonator 11H. The first other portion 11Cq is electrically connected to the enclosure member 10G of the first other cavity resonator 11L. The first opposing portion 11Cr is capacitively coupled to the inner member 10S (see FIG. 2) of the first cavity resonator 11H. The first opposing other portion 11Cs is capacitively coupled to the inner member 10S of the first other cavity resonator 11L. The first portion 11Cp and the first other portion 11Cq are set to a fixed potential (e.g., a ground potential).

In the computing device 111, the second coupler 12C includes a second portion 12Cp, a second other portion 12Cq, a second opposing portion 12Cr and a second opposing other portion 12Cs. The second opposing portion 12Cr is electrically connected to an end of the second Josephson junction 12Ca and an end of the second intermediate Josephson junction 12Cc. The second opposing other portion 12Cs is electrically connected to an end of the second other Josephson junction 12Cb and another end of the second intermediate Josephson junction 12Cc. The second portion 12Cp is electrically connected to another end of the second Josephson junction 12Ca and another end of the second other Josephson junction 12Cb. The second other portion 12Cq is electrically connected to another end of the second Josephson junction 12Ca and another end of the second other Josephson junction 12Cb.

The second portion 12Cp is electrically connected to the enclosure member 10G of the second cavity resonator 12H. The second other portion 12Cq is electrically connected to the enclosure member 10G of the second other cavity resonator 12L. The second opposing portion 12Cr is capacitively coupled to the inner member 10S of the second cavity resonator 12H. The second opposing other portion 12Cs is capacitively coupled to the inner member 10S of the second other cavity resonator 12L. The second portion 12Cp and the second other portion 12Cq are set to a fixed potential (e.g., a ground potential).

In the computing device 111, the third coupler 13C includes a third portion 13Cp, a third other portion 13Cq, a third opposing portion 13Cr and a third opposing other portion 13Cs. The third opposing portion 13Cr is electrically connected to an end of the third Josephson junction 13Ca and an end of the third intermediate Josephson junction 13Cc. The third opposing other portion 13Cs is electrically connected to an end of the third other Josephson junction 13Cb and another end of the third intermediate Josephson junction 13Cc. The third portion 13Cp is electrically connected to another end of the third Josephson junction 13Ca and another end of the third other Josephson junction 13Cb. The third other portion 13Cq is electrically connected to another end of the third Josephson junction 13Ca and another end of the third other Josephson junction 13Cb.

The third portion 13Cp is electrically connected to the enclosure member 10G of the third other cavity resonator 13L. The third other portion 13Cq is electrically connected to the enclosure member 10G of the third cavity resonator 13H. The third opposing portion 13Cr is capacitively coupled to the inner member 10S of the third other cavity resonator 13L. The third opposing other portion 13Cs is capacitively coupled to the inner member 10S of the third other cavity resonator 13L. The third portion 13Cp and the third other portion 13Cq are set to a fixed potential (e.g., a ground potential).

In the computing device 111, the fourth coupler 14C includes a fourth portion 14Cp, a fourth other portion 14Cq, a fourth opposing portion 14Cr and a fourth opposing other portion 14Cs. The fourth opposing portion 14Cr is electrically connected to an end of the fourth Josephson junction 14Ca and an end of the fourth intermediate Josephson junction 14Cc. The fourth opposing other portion 14Cs is electrically connected to an end of the fourth other Josephson junction 14Cb and another end of the fourth intermediate Josephson junction 14Cc. The fourth portion 14Cp is electrically connected to another end of the fourth Josephson junction 14Ca and another end of the fourth other Josephson junction 14Cb. The fourth other portion 14Cq is electrically connected to another end of the fourth Josephson junction 14Ca and another end of the fourth other Josephson junction 14Cb.

The fourth portion 14Cp is electrically connected to the enclosure member 10G of the fourth other cavity resonator 14L. The fourth other portion 14Cq is electrically connected to the enclosure member 10G of the fourth cavity resonator 14H. The fourth opposing portion 14Cr is capacitively coupled to the inner member 10S of the fourth other cavity resonator 14L. The fourth opposing other portion 14Cs is capacitively coupled to the inner member 10S of the fourth other cavity resonator 14L. The fourth portion 14Cp and the fourth other portion 14Cq are set to a fixed potential (e.g., a ground potential).

In the computing device 111, the first coupling structure 21 includes a first coupling portion 21*p*, a first coupling other portion 21*q*, a first coupling opposing portion 21*r*, and a first coupling opposing other portion 21*s*. The first coupling opposing portion 21*r* is electrically connected to an end of the first coupling Josephson junction 21*a* and an end of the first coupling intermediate Josephson junction 21*c*. The first coupling opposing other portion 21*s* is electrically connected to an end of the first coupling other Josephson junction 21*b* and another end of the first coupling intermediate Josephson junction 21*c*. The first coupling portion 21*p* is electrically connected to another end of the first coupling Josephson junction 21*a* and another end of the first coupling other Josephson junction 21*b*. The first coupling other portion 21*q* is electrically connected to another end of the first coupling Josephson junction 21*a* and another end of the first coupling other Josephson junction 21*b*.

The first coupling portion 21*p* is electrically connected to the enclosure member 10G of the first other cavity resonator 11L. The first coupling other portion 21*q* is electrically connected to the enclosure member 10G of the second cavity resonator 12H. The first coupling opposing portion 21*r* is capacitively coupled to the inner member 10S of the first other cavity resonator 11L. The first coupling opposing portion 21*s* is capacitively coupled to the inner member 10S of the second cavity resonator 12H. The first coupling portion 21*p* and the first coupling other portion 21*q* are set to a fixed potential (e.g., ground potential), for example.

In the computing device 111, the second coupling structure 22 includes a second coupling portion 22*p*, a second coupling other portion 22*q*, a second coupling opposing portion 22*r*, and a second coupling opposing other portion 22*s*. The second coupling opposing portion 22*r* is electrically connected to an end of the second coupling Josephson junction 22*a* and an end of the second coupling intermediate Josephson junction 22*c*. The second coupling opposing other portion 22*s* is electrically connected to an end of the second coupling other Josephson junction 22*b* and another end of the second coupling intermediate Josephson junction 22*c*. The second coupling portion 22*p* is electrically connected to another end of the second coupling Josephson junction 22*a* and another end of the second coupling other Josephson junction 22*b*. The second coupling other portion 22*q* is electrically connected to another end of the second coupling Josephson junction 22*a* and another end of the second coupling other Josephson junction 22*b*.

The second coupling portion 22*p* is electrically connected to the enclosure member 10G of the first other cavity resonator 11L. The second coupling other portion 22*q* is electrically connected to the enclosure member 10G of the third cavity resonator 13H. The second coupling opposing portion 22*r* is capacitively coupled to the inner member 10S of the first other cavity resonator 11L. The second coupling opposing other portion 22*s* is capacitively coupled to the inner member 10S of the third cavity resonator 13H. The second coupling portion 22*p* and the second coupling other portion 22*q* are set to a fixed potential (e.g., ground potential), for example.

In the computing device 111, the third coupling structure 23 includes a third coupling portion 23*p*, a third coupling other portion 23*q*, a third coupling opposing portion 23*r*, and a third coupling opposing other portion 23*s*. The third coupling opposing portion 23*r* is electrically connected to an end of the third coupling Josephson junction 23*a* and an end of the third coupling intermediate Josephson junction 23*c*. The third coupling opposing other portion 23*s* is electrically connected to an end of the third coupling other Josephson junction 23*b* and another end of the third coupling intermediate Josephson junction 23*c*. The third coupling portion 23*p* is electrically connected to another end of the third coupling Josephson junction 23*a* and another end of the third coupling other Josephson junction 23*b*. The third coupling other portion 23*q* is electrically connected to another end of the third coupling Josephson junction 23*a* and another end of the third coupling other Josephson junction 23*b*.

The third coupling portion 23*p* is electrically connected to the enclosure member 10G of the second other cavity resonator 12L. The third coupling other portion 23*q* is electrically connected to the enclosure member 10G of the fourth cavity resonator 14H. The third coupling opposing portion 23*r* is capacitively coupled to the inner member 10S of the third other cavity resonator 13L. The third coupling opposing other portion 23*s* is capacitively coupled to the inner member 10S of the fourth cavity resonator 14H. The third coupling portion 23*p* and the third coupling other portion 23*q* are set to a fixed potential (e.g., ground potential), for example.

In the computing device 111, the fourth coupling structure 24 includes a fourth coupling portion 24*p*, a fourth coupling other portion 24*q*, a fourth coupling opposing portion 24*r*, and a fourth coupling opposing other portion 24*s*. The fourth coupling opposing portion 24*r* is electrically connected to an end of the fourth coupling Josephson junction 24*a* and an end of the fourth coupling intermediate Josephson junction 24*c*. The fourth coupling opposing other portion 24*s* is electrically connected to an end of the fourth coupling other Josephson junction 24*b* and another end of the fourth coupling intermediate Josephson junction 24*c*. The fourth coupling portion 24*p* is electrically connected to another end of the fourth coupling Josephson junction 24*a* and another end of the fourth coupling other Josephson junction 24*b*. The fourth coupling other portion 24*q* is electrically connected to another end of the fourth coupling Josephson junction 24*a* and another end of the fourth coupling other Josephson junction 24*b*.

The fourth coupling portion 24*p* is electrically connected to the enclosure member 10G of the third cavity resonator 13H. The fourth coupling other portion 24*q* is electrically connected to the enclosure member 10G of the fourth other cavity resonator 14L. The fourth coupling opposing portion 24*r* is capacitively coupled to the inner member 10S of the third cavity resonator 13H. The fourth coupling opposing other portion 24*s* is capacitively coupled to the inner member 10S of the fourth other cavity resonator 14L. The fourth coupling portion 24*p* and the fourth coupling other portion 24*q* are set to a fixed potential (e.g., ground potential), for example.

The enclosure member 10G includes a superconductor. For example, the inner member 10S corresponds to a signal line. When the enclosure member 10G is set to a fixed potential (e.g., ground potential), for example, stable characteristics can be obtained.

Second Embodiment

Figure 5:
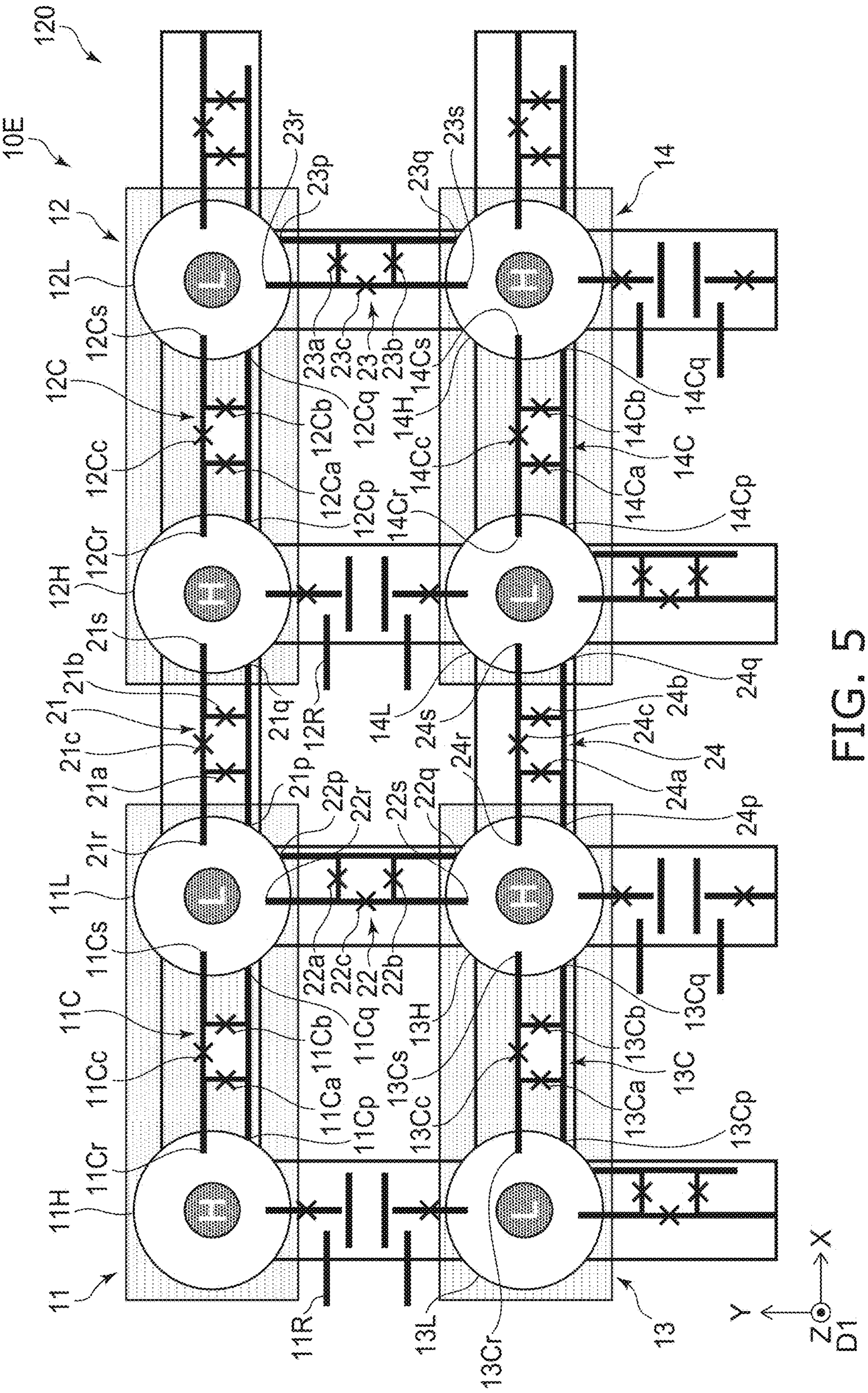
FIG. 5 is a schematic plan view illustrating a computing device according to a second embodiment.

FIG. 5 is a schematic plan view illustrating a computing device according to the second embodiment.

As shown in FIG. 5, in a computing device 120 according to the embodiment, at least one of the controller 70, the conductive portions and the coupling conductive portions is omitted. Other configurations of the computing device 120 may be the same as the configuration of the computing device 111.

In the computing device 120, at least one of the coupler or the coupling structure includes a double transmon coupler. In the computing device 120, stable bit operation can be executed at high speed. A computing device capable of improving characteristics is provided.

Embodiments may include the following Technical proposals:

(Technical Proposal 1)

A computing device, comprising:

an element section;

a first conductive portion;

a second conductive portion;

a first coupling conductive portion; and a controller, the element section including a first structure, a second structure, and a first coupling structure, the first structure including a first cavity resonator having a first resonance frequency, a first other cavity resonator having a first other resonance frequency, and a first coupler configured to couple the first cavity resonator and the first other cavity resonator, the first other resonance frequency being lower than the first resonance frequency, the second structure including a second cavity resonator having a second resonance frequency, a second other cavity resonator having a second other resonance frequency, and a second coupler configured to couple the second cavity resonator and the second other cavity resonator, the second other resonance frequency being lower than the second resonance frequency, the first coupling structure being configured to couple the first structure and the second structure, the controller being configured to supply a first AC signal including an AC component to the first conductive portion, the controller being configured to supply a second AC signal including an AC component to the second conductive portion, a first magnetic field generated from the first conductive portion in response to the first AC signal being applied to the first coupler, a second magnetic field generated from the second conductive portion in response to the second AC signal being applied to the second coupler, the controller being configured to supply a first DC pulse signal to the first coupling conductive portion, and a first coupling magnetic field generated from the first coupling conductive portion in response to the first DC pulse signal being applied to the first coupling structure.

(Technical Proposal 2)

The computing device according to Technical proposal 1, wherein a first state is before the first DC pulse signal is supplied to the first coupling conductive portion, in a second state, the first DC pulse signal is supplied to the first coupling conductive portion, and a difference between a first state resonance frequency of the first coupling structure in the first state and the first other resonance frequency is larger than a difference between a second state resonance frequency of the first coupling structure in the second state and the first other resonance frequency.

(Technical Proposal 3)

The computing device according to Technical proposal 1, wherein a first state is before the first DC pulse signal is supplied to the first coupling conductive portion, in a second state, the first DC pulse signal is supplied to the first coupling conductive portion, and a difference between a first state resonance frequency of the first coupling structure in the first state and the second resonance frequency is larger than a difference between a second state resonance frequency of the first coupling structure in the second state and the second resonance frequency.

(Technical Proposal 4)

The computing device according to any one of Technical proposals 1-3, wherein the first other cavity resonator is provided between the first cavity resonator and the first coupling structure, the second cavity resonator is provided between the first coupling structure and the second other cavity resonator, and the first coupling structure is provided between the first other cavity resonator and the second cavity resonator.

(Technical Proposal 5)

The computing device according to any one of Technical proposals 1-4, wherein the first coupling structure is configured to couple with the first other cavity resonator and the second cavity resonator.

(Technical Proposal 6)

The computing device according to any one of Technical proposals 1-5, wherein the first coupler includes a first Josephson junction and a first other Josephson junction connected in parallel with the first Josephson junction, the second coupler includes a second Josephson junction and a second other Josephson junction connected in parallel with the second Josephson junction, and the first coupling structure includes a first coupling Josephson junction and a first coupling other Josephson junction connected in parallel with the first coupling Josephson junction.

(Technical Proposal 7)

The computing device according to any one of Technical proposals 1-5, wherein the first coupling structure includes a first coupling Josephson junction, a first coupling other Josephson junction, and a first coupling intermediate Josephson junction, an end of the first coupling intermediate Josephson junction is connected to an end of the first coupling intermediate Josephson junction, another end of the first coupling Josephson junction is connected to another end of the first coupling other Josephson junction, and an end of the first coupling other Josephson junction is connected to another end of the first coupling intermediate Josephson junction.

(Technical Proposal 8)

The computing device according to Technical proposal 7, wherein the first coupler includes a first Josephson junction, a first other Josephson junction, and a first intermediate Josephson junction, an end of the first Josephson junction is connected to an end of the first intermediate Josephson junction, another end of the first Josephson junction is connected to another end of the first other Josephson junction, and an end of the first other Josephson junction is connected to another end of the first intermediate Josephson junction.

(Technical Proposal 9)

The computing device according to Technical proposal 8, wherein the second coupler includes a second Josephson junction, a second other Josephson junction, and a second intermediate Josephson junction, an end of the second Josephson junction is connected to an end of the second intermediate Josephson junction, another end of the second Josephson junction is connected to another end of the second other Josephson junction, and an end of the second other Josephson junction is connected to another end of the second intermediate Josephson junction.

(Technical Proposal 10)

The computing device according to any one of Technical proposals 1-9, further comprising:

a third conductive portion; and a second coupling conductive portion, the element section including a third structure and a second coupling structure, the third structure including a third cavity resonator having a third resonance frequency, a third other cavity resonator having a third other resonance frequency, and a third coupler configured to couple the third cavity resonator and the third other cavity resonator, the third other resonance frequency being lower than the third resonance frequency, the second coupling structure being configured to couple the first other cavity resonator and the third cavity resonator, the controller being configured to supply a third AC signal including an AC component to the third conductive portion, a third magnetic field generated from the third conductive portion being applied to the third coupler in accordance with the third AC signal, the controller being configured to supply a second DC pulse signal to the second coupling conductive portion, and a second coupling magnetic field generated from the second coupling conductive portion in response to the second DC pulse signal being applied to the second coupling structure.

(Technical Proposal 11)

The computing device according to Technical proposal 10, further comprising:

a first read resonator, and the first read resonator being configured to be coupled to the first cavity resonator and the third other cavity resonator.

(Technical Proposal 12)

The computing device according to Technical proposal 10 or 11, further comprising:

a fourth conductive portion; and a third coupling conductive portion, the element section including a fourth structure and a third coupling structure, the fourth structure including a fourth cavity resonator having a fourth resonance frequency, a fourth other cavity resonator having a fourth other resonance frequency, and a fourth coupler configured to couple the fourth cavity resonator and the fourth other cavity resonator, the fourth other resonance frequency being lower than the fourth resonance frequency, the third coupling structure being configure to couple the second other cavity resonator and the fourth cavity resonator, the controller being configured to supply a fourth AC signal including an AC component to the fourth conductive portion, and a fourth magnetic field generated from the fourth conductive portion in accordance with the fourth AC signal being applied to the fourth coupler.

(Technical Proposal 13)

The computing device according to Technical proposal 12, further comprising:

a second read resonator, and the second read resonator being configured to be coupled to the second cavity resonator and the fourth other cavity resonator.

(Technical Proposal 14)

The computing device according to Technical proposal 12 or 13, further comprising:

a fourth coupling conductive portion, the element section including a fourth coupling structure, the fourth coupling structure being configured to couple the third cavity resonator and the fourth other cavity resonator, the controller being configured to supply a fourth DC pulse signal to the fourth coupling conductive portion, and a fourth coupling magnetic field generated from the fourth coupling conductive portion in accordance with the fourth DC pulse signal being applied to the fourth coupling structure.

(Technical Proposal 15)

A computing device, comprising:

an element section, the element section including a first structure, a second structure, and a first coupling structure, the first structure including a first cavity resonator having a first resonance frequency, a first other cavity resonator having a first other resonance frequency, and a first coupler configured to couple the first cavity resonator and the first other cavity resonator, the first other resonance frequency being lower than the first resonance frequency, the second structure including a second cavity resonator having a second resonance frequency, a second other cavity resonator having a second other resonance frequency, and a second coupler configured to couple the second cavity resonator and the second other cavity resonator, the second other resonance frequency being lower than the second resonance frequency, and the first coupling structure being configured to couple the first structure and the second structure.

(Technical Proposal 16)

The computing device according to Technical proposal 15, wherein the first coupling structure includes a first coupling Josephson junction, a first coupling other Josephson junction, and a first coupling intermediate Josephson junction, an end of the first coupling Josephson junction is connected to an end of the first coupling intermediate Josephson junction, another end of the first coupling Josephson junction is connected to another end of the first coupling other Josephson junction, and an end of the first coupling other Josephson junction is connected to another end of the first coupling intermediate Josephson junction.

(Technical Proposal 17)

The computing device according to Technical proposal 15 or 16, wherein the first coupler includes a first Josephson junction, a first other Josephson junction, and a first intermediate Josephson junction, an end of the first Josephson junction is connected to an end of the first intermediate Josephson junction, another end of the first Josephson junction is connected to another end of the first other Josephson junction, an end of the first other Josephson junction is connected to another end of the first intermediate Josephson junction, the second coupler includes a second Josephson junction, a second other Josephson junction, and a second intermediate Josephson junction, an end of the second Josephson junction is connected to an end of the second intermediate Josephson junction, another end of the second Josephson junction is connected to another end of the second other Josephson junction, and an end of the second other Josephson junction is connected to another end of the second intermediate Josephson junction.

(Technical Proposal 18)

The computing device according to any one of Technical proposals 15-17, wherein the element section includes a third structure and a second coupling structure, the third structure includes a third cavity resonator having a third resonance frequency a third other cavity resonator having a third other resonance frequency, and a third coupler configured to couple the third cavity resonator and the third other cavity resonator, the third other resonance frequency is lower than the third resonance frequency, the second coupling structure is configured to couple the first other cavity resonator and the third cavity resonator, the third coupler includes a third Josephson junction, a third other Josephson junction, and a third intermediate Josephson junction, an end of the third Josephson junction is connected to an end of the third intermediate Josephson junction, another end of the third Josephson junction is connected to another end of the third other Josephson junction, and an end of the third other Josephson junction is connected to another end of the third intermediate Josephson junction.

(Technical Proposal 19)

The computing device according to Technical proposal 18, wherein the element section includes a fourth structure and a third coupling structure, the fourth structure includes a fourth cavity resonator having a fourth resonance frequency, a fourth other cavity resonator having a fourth other resonance frequency, and a fourth coupler configured to couple the fourth cavity resonator and the fourth other cavity resonator, the fourth other resonance frequency is lower than the fourth resonance frequency, the third coupling structure is configured to couple the second other cavity resonator and the fourth cavity resonator, the fourth coupler includes a fourth Josephson junction, a fourth other Josephson junction, and a fourth intermediate Josephson junction, an end of the fourth Josephson junction is connected to an end of the fourth intermediate Josephson junction, another end of the fourth Josephson junction is connected to another end of the fourth other Josephson junction, and an end of the fourth other Josephson junction is connected to another end of the fourth intermediate Josephson junction.

(Technical Proposal 20)

The computing device according to Technical proposal 7 or 16, wherein the first coupling structure includes a first coupling portion, a first coupling other portion, a first coupling opposing portion, and a first coupling opposing other portion, the first coupling opposing portion is electrically connected to an end of the first coupling Josephson junction and an end of the first coupling intermediate Josephson junction, the first coupling opposing other portion is electrically connected to an end of the first coupling other Josephson junction and another end of the first coupling intermediate Josephson junction, the first coupling portion is electrically connected to another end of the first coupling other Josephson junction and another end of the first coupling other Josephson junction, the first coupling other portion is electrically connected to another end of the first coupling Josephson junction and another end of the first coupling other Josephson junction, the first coupling portion is electrically connected to a first other cavity resonator enclosure member of the first other cavity resonator, the first coupling other portion is electrically connected to a second cavity resonator enclosure member of the second cavity resonator, the first coupling opposing portion is capacitively coupled to a first other cavity resonator inner member of the first other cavity resonator, and the first coupling opposing portion is capacitively coupled to a second cavity resonator inner member of the second cavity resonator.

According to the embodiment, a computing device capable of improving characteristics can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in the computing devices such as structures, cavity resonators, couplers, coupling structures, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all computing devices practicable by an appropriate design modification by one skilled in the art based on the computing devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A computing device, comprising:
an element section;
a first conductive portion;
a second conductive portion;
a first coupling conductive portion; and
a controller,
the element section including a first structure, a second structure, and a first coupling structure,
the first structure including
a first cavity resonator having a first resonance frequency,
a first other cavity resonator having a first other resonance frequency, and
a first coupler configured to couple the first cavity resonator and the first other cavity resonator,
the first other resonance frequency being lower than the first resonance frequency,
the second structure including
a second cavity resonator having a second resonance frequency,
a second other cavity resonator having a second other resonance frequency, and
a second coupler configured to couple the second cavity resonator and the second other cavity resonator,
the second other resonance frequency being lower than the second resonance frequency,
the first coupling structure being configured to couple the first structure and the second structure,
the controller being configured to supply a first AC signal including an AC component to the first conductive portion,
the controller being configured to supply a second AC signal including an AC component to the second conductive portion,
a first magnetic field generated from the first conductive portion in response to the first AC signal being applied to the first coupler,
a second magnetic field generated from the second conductive portion in response to the second AC signal being applied to the second coupler, the controller being configured to supply a first DC pulse signal to the first coupling conductive portion, and
a first coupling magnetic field generated from the first coupling conductive portion in response to the first DC pulse signal being applied to the first coupling structure.

2. The device according to claim 1, wherein
a first state is before the first DC pulse signal is supplied to the first coupling conductive portion,
in a second state, the first DC pulse signal is supplied to the first coupling conductive portion, and
a difference between a first state resonance frequency of the first coupling structure in the first state and the first other resonance frequency is larger than a difference between a second state resonance frequency of the first coupling structure in the second state and the first other resonance frequency.

3. The device according to claim 1, wherein
a first state is before the first DC pulse signal is supplied to the first coupling conductive portion,
in a second state, the first DC pulse signal is supplied to the first coupling conductive portion, and
a difference between a first state resonance frequency of the first coupling structure in the first state and the second resonance frequency is larger than a difference between a second state resonance frequency of the first coupling structure in the second state and the second resonance frequency.

4. The device according to claim 1, wherein
the first other cavity resonator is provided between the first cavity resonator and the first coupling structure,
the second cavity resonator is provided between the first coupling structure and the second other cavity resonator, and
the first coupling structure is provided between the first other cavity resonator and the second cavity resonator.

5. The device according to claim 1, wherein
the first coupling structure is configured to couple with the first other cavity resonator and the second cavity resonator.

6. The device according to claim 1, wherein
the first coupler includes a first Josephson junction and a first other Josephson junction connected in parallel with the first Josephson junction,
the second coupler includes a second Josephson junction and a second other Josephson junction connected in parallel with the second Josephson junction, and
the first coupling structure includes a first coupling Josephson junction and a first coupling other Josephson junction connected in parallel with the first coupling Josephson junction.

7. The device according to claim 1, wherein
the first coupling structure includes a first coupling Josephson junction, a first coupling other Josephson junction, and a first coupling intermediate Josephson junction,
an end of the first coupling intermediate Josephson junction is connected to an end of the first coupling intermediate Josephson junction,
another end of the first coupling Josephson junction is connected to another end of the first coupling other Josephson junction, and
an end of the first coupling other Josephson junction is connected to another end of the first coupling intermediate Josephson junction.

8. The device according to claim 7, wherein
the first coupler includes a first Josephson junction, a first other Josephson junction, and a first intermediate Josephson junction,
an end of the first Josephson junction is connected to an end of the first intermediate Josephson junction,
another end of the first Josephson junction is connected to another end of the first other Josephson junction, and
an end of the first other Josephson junction is connected to another end of the first intermediate Josephson junction.

9. The device according to claim 8, wherein
the second coupler includes a second Josephson junction, a second other Josephson junction, and a second intermediate Josephson junction,
an end of the second Josephson junction is connected to an end of the second intermediate Josephson junction,
another end of the second Josephson junction is connected to another end of the second other Josephson junction, and
an end of the second other Josephson junction is connected to another end of the second intermediate Josephson junction.

10. The device according to claim 7, wherein
the first coupling structure includes a first coupling portion, a first coupling other portion, a first coupling opposing portion, and a first coupling opposing other portion,
the first coupling opposing portion is electrically connected to an end of the first coupling Josephson junction and an end of the first coupling intermediate Josephson junction,
the first coupling opposing other portion is electrically connected to an end of the first coupling other Josephson junction and another end of the first coupling intermediate Josephson junction,
the first coupling portion is electrically connected to another end of the first coupling other Josephson junction and another end of the first coupling other Josephson junction,
the first coupling other portion is electrically connected to another end of the first coupling Josephson junction and another end of the first coupling other Josephson junction,
the first coupling portion is electrically connected to a first other cavity resonator enclosure member of the first other cavity resonator,
the first coupling other portion is electrically connected to a second cavity resonator enclosure member of the second cavity resonator,
the first coupling opposing portion is capacitively coupled to a first other cavity resonator inner member of the first other cavity resonator, and
the first coupling opposing portion is capacitively coupled to a second cavity resonator inner member of the second cavity resonator.

11. The device according to claim 1, further comprising:
a third conductive portion; and
a second coupling conductive portion,
the element section including a third structure and a second coupling structure,
the third structure including
a third cavity resonator having a third resonance frequency,
a third other cavity resonator having a third other resonance frequency, and
a third coupler configured to couple the third cavity resonator and the third other cavity resonator,
the third other resonance frequency being lower than the third resonance frequency,
the second coupling structure being configured to couple the first other cavity resonator and the third cavity resonator,
the controller being configured to supply a third AC signal including an AC component to the third conductive portion,
a third magnetic field generated from the third conductive portion being applied to the third coupler in accordance with the third AC signal,
the controller being configured to supply a second DC pulse signal to the second coupling conductive portion, and
a second coupling magnetic field generated from the second coupling conductive portion in response to the second DC pulse signal being applied to the second coupling structure.

12. The device according to claim 11, further comprising:
a first read resonator, and
the first read resonator being configured to be coupled to the first cavity resonator and the third other cavity resonator.

13. The device according to claim 11, further comprising:
a fourth conductive portion; and
a third coupling conductive portion,
the element section including a fourth structure and a third coupling structure,
the fourth structure including
a fourth cavity resonator having a fourth resonance frequency,
a fourth other cavity resonator having a fourth other resonance frequency, and
a fourth coupler configured to couple the fourth cavity resonator and the fourth other cavity resonator,
the fourth other resonance frequency being lower than the fourth resonance frequency,
the third coupling structure being configure to couple the second other cavity resonator and the fourth cavity resonator,
the controller being configured to supply a fourth AC signal including an AC component to the fourth conductive portion, and
a fourth magnetic field generated from the fourth conductive portion in accordance with the fourth AC signal being applied to the fourth coupler.

14. The device according to claim 13, further comprising:
a second read resonator, and
the second read resonator being configured to be coupled to the second cavity resonator and the fourth other cavity resonator.

15. The device according to claim 13, further comprising:
a fourth coupling conductive portion,
the element section including a fourth coupling structure,
the fourth coupling structure being configured to couple the third cavity resonator and the fourth other cavity resonator,
the controller being configured to supply a fourth DC pulse signal to the fourth coupling conductive portion, and
a fourth coupling magnetic field generated from the fourth coupling conductive portion in accordance with the fourth DC pulse signal being applied to the fourth coupling structure.

16. A computing device, comprising:
an element section,
the element section including a first structure, a second structure, and a first coupling structure,
the first structure including
a first cavity resonator having a first resonance frequency,
a first other cavity resonator having a first other resonance frequency, and
a first coupler configured to couple the first cavity resonator and the first other cavity resonator,
the first other resonance frequency being lower than the first resonance frequency,
the second structure including
a second cavity resonator having a second resonance frequency,
a second other cavity resonator having a second other resonance frequency, and
a second coupler configured to couple the second cavity resonator and the second other cavity resonator,
the second other resonance frequency being lower than the second resonance frequency, and
the first coupling structure being configured to couple the first structure and the second structure.

17. The device according to claim 16, wherein
the first coupling structure includes a first coupling Josephson junction, a first coupling other Josephson junction, and a first coupling intermediate Josephson junction,
an end of the first coupling Josephson junction is connected to an end of the first coupling intermediate Josephson junction,
another end of the first coupling Josephson junction is connected to another end of the first coupling other Josephson junction, and
an end of the first coupling other Josephson junction is connected to another end of the first coupling intermediate Josephson junction.

18. The device according to claim 16, wherein
the first coupler includes a first Josephson junction, a first other Josephson junction, and a first intermediate Josephson junction,
an end of the first Josephson junction is connected to an end of the first intermediate Josephson junction,
another end of the first Josephson junction is connected to another end of the first other Josephson junction,
an end of the first other Josephson junction is connected to another end of the first intermediate Josephson junction,
the second coupler includes a second Josephson junction, a second other Josephson junction, and a second intermediate Josephson junction,
an end of the second Josephson junction is connected to an end of the second intermediate Josephson junction,
another end of the second Josephson junction is connected to another end of the second other Josephson junction, and
an end of the second other Josephson junction is connected to another end of the second intermediate Josephson junction.

19. The device according to claim 16, wherein
the element section includes a third structure and a second coupling structure,
the third structure includes
a third cavity resonator having a third resonance frequency
a third other cavity resonator having a third other resonance frequency, and
a third coupler configured to couple the third cavity resonator and the third other cavity resonator,
the third other resonance frequency is lower than the third resonance frequency,
the second coupling structure is configured to couple the first other cavity resonator and the third cavity resonator,
the third coupler includes a third Josephson junction, a third other Josephson junction, and a third intermediate Josephson junction,
an end of the third Josephson junction is connected to an end of the third intermediate Josephson junction,
another end of the third Josephson junction is connected to another end of the third other Josephson junction, and
an end of the third other Josephson junction is connected to another end of the third intermediate Josephson junction.

20. The device according to claim 19, wherein
the element section includes a fourth structure and a third coupling structure,
the fourth structure includes
a fourth cavity resonator having a fourth resonance frequency,
a fourth other cavity resonator having a fourth other resonance frequency, and
a fourth coupler configured to couple the fourth cavity resonator and the fourth other cavity resonator,
the fourth other resonance frequency is lower than the fourth resonance frequency,
the third coupling structure is configured to couple the second other cavity resonator and the fourth cavity resonator,
the fourth coupler includes a fourth Josephson junction, a fourth other Josephson junction, and a fourth intermediate Josephson junction,
an end of the fourth Josephson junction is connected to an end of the fourth intermediate Josephson junction,
another end of the fourth Josephson junction is connected to another end of the fourth other Josephson junction, and
an end of the fourth other Josephson junction is connected to another end of the fourth intermediate Josephson junction.

* * * * *